United States Patent [19]

Uebel

[11] Patent Number: 4,616,312

[45] Date of Patent: Oct. 7, 1986

[54] 2-OUT-OF-3 SELECTING FACILITY IN A 3-COMPUTER SYSTEM

[75] Inventor: Helmut Uebel, Leonberg, Fed. Rep. of Germany

[73] Assignee: International Standard Electric Corporation, New York, N.Y.

[21] Appl. No.: 470,756

[22] Filed: Feb. 28, 1983

[51] Int. Cl.⁴ .................. G06F 11/18; G06F 11/00
[52] U.S. Cl. .................... 364/200; 371/36; 371/11
[58] Field of Search .............. 364/200, 900; 371/11, 371/36, 63, 67, 68

[56] References Cited

U.S. PATENT DOCUMENTS

| | | | |
|---|---|---|---|
| 3,735,356 | 5/1973 | Yates | 364/200 |
| 3,848,116 | 11/1974 | Möder et al. | 371/36 |
| 3,876,987 | 4/1975 | Dalton et al. | 364/200 |
| 3,921,149 | 11/1975 | Kresis et al. | 364/200 X |
| 4,015,246 | 3/1977 | Hopkins, Jr. et al. | 364/200 |
| 4,342,083 | 7/1982 | Freedman et al. | 364/200 X |
| 4,356,546 | 10/1982 | Whiteside et al. | 371/36 |
| 4,375,683 | 3/1983 | Wensley | 371/36 |
| 4,392,199 | 7/1983 | Schmitter et al. | 371/36 |

*Primary Examiner*—James D. Thomas
*Assistant Examiner*—William G. Niessen
*Attorney, Agent, or Firm*—John T. O'Halloran

[57] ABSTRACT

A fail-safe 2-out-of-3 selecting facility for a 3-computer system is disclosed which is especially suitable for use together with microprocessors having a large number of outputs. The computers (R1 ... R3) of the 3-computer system handle the same information in parallel but asynchronously, exchange their results, and compare them. The output buses (A1, A3) of two computers (R1, R3) transfer the results in nonequivalent form, and are connected to two data output channels (AK1, AK2) via separate transfer switches (U1, U2). Depending on the result of the comparisons performed in the computers, the output ports of faulty computers are disconnected and the transfer switches are controlled in such a way that the output port of a faulty computer is disconnected from the associated data output channel, and that the output port (A2) of the third computer (R2) is connected to this channel instead. Depending on which computer is to be replaced, the third computer (R2) delivers its information in uninverted or inverted form. The operation of the transfer switches can be monitored by a serial nonequivalence check on the information transfered over the data output channels (AK1, AK2).

2 Claims, 1 Drawing Figure

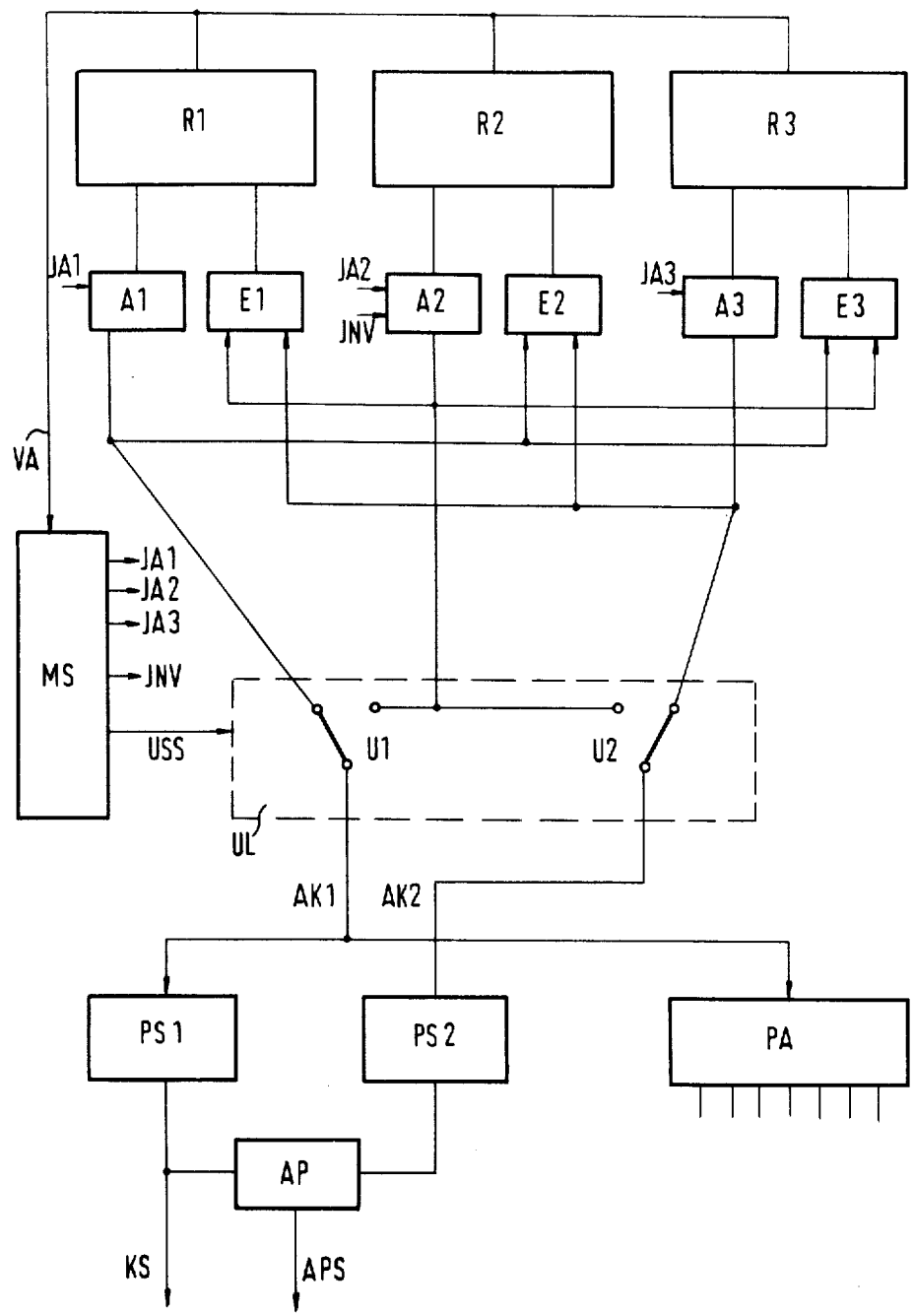

2-OUT-OF-3 SELECTING FACILITY IN A 3-COMPUTER SYSTEM

BACKGROUND OF THE INVENTION

Facilities of this kind are needed in computer systems where information having safety implications is processed by several computers in parallel, and where the results are delivered only if received by the facility in identical form from a majority of the computers.

For example, DE-OS No. 21 08 496 (particularly FIG. 2) discloses a circuit arrangement in which the outputs from three computers handling the information in parallel are compared in pairs by comparator circuits. The results of the comparisons are fed to a control circuit which makes a majority decision. According to the results of the majority decision, a switching facility is so controlled that only that information is output onto communication channels which was produced by a majority of the computers. The outputs from the comparator circuits and the control circuit are fed back to the computers, which can thus monitor the operation of these circuits. Such a circuit arrangement is suitable for applications in which only few outputs, e.g., serial data telegram outputs, are needed to deliver the results produced by the computers. In such circuit arrangements, the amount of circuitry required for comparators and switching facilities is approximately proportional to the number of outputs required, so that in applications with large numbers of outputs, e.g., if microcomputers are employed, the costs of a comparator and majority-voting logic circuit designed in the manner of the circuit arrangement described in DE-OS No. 21 08 496 would be prohibitive.

It is also known (see, for example, DE-OS No. 30 09 355, particularly page 3) to have the comparison necessary prior to each majority decision performed by the computers themselves. In that case, the computers exchange their results or, as described in DE-OS No. 30 09 355, reduced amounts of data derived from these results. The prior publication shows neither how a majority decision can be made with three computers nor how the results produced by the majority of the computers can be output in a safe manner.

The object of the invention is to provide a 2-out-of-3 selecting facility of this kind which permits a majority decision and a fail-safe output of the result produced by the majority of the computers without the need for expensive, fail-safe circuit components. It is described by the features of claim 1.

The selecting facility according to the invention is especially suited for use together with microcomputers having a large number of outputs. As the results produced by the computers need no longer be compared in pairs outside the computers, no comparator circuits with large numbers of components are required. The transfer switches switch the output buses rather than the individual outputs, so that their design no longer depends on the number of outputs.

A development of the selecting facility according to the invention relates to a majority voting circuit suitable for a microcomputer system.

A further development concerns the assignment of the computer outputs to the transfer switches. With this development, in conjunction with special operations performed on the results appearing at the output ports, maximum safety is achieved using a particularly simple transfer-switch configuration.

BRIEF DESCRIPTION OF THE DRAWING

An embodiment of the selecting facility according to the invention will now be described in detail with reference to the accompanying drawing which is a schematic circuit.

DESCRIPTION OF THE PREFERRED EMBODIMENT

The drawing shows three computers R1 ... R3, e.g., microcomputers, with disconnectable output ports A1 ... A3 and comparison data input ports E1 ... E3. All computers are fed with the same useful information over data lines (not shown) and process this information in parallel. They have independent clocks and, therefore, generally operate asynchronously. A result appearing at the output port A1 ... A3 of each computer after the execution of each program segment is fed to a switching logic UL common to all three computers. In addition, it is fed to the comparison input ports of the two neighboring computers, which compare it with the results produced by themselves. The result of the comparisons are transferred over a line VA to a majority voting circuit MS, which, depending on the combination of comparison indications received from the individual computers, delivers an associated group of control instructions from a read-only memory (not shown). With the control instructions JA1 ... JA3, the output ports of the computers can be irreversibly disconnected—this will be done, for example, if one of the computers must be regarded as faulty in view of the comparison indications from the other computers—and over a control line USS, two transfer switches U1 and U2 can be operated in the switching logic UL. A further control instruction JNV causes the result produced by the computer R2 to be delivered to the switching logic in inverted form.

The switching logic contains essentially the transfer switches U1 and U2. The latter are operated independently of each other and, during trouble-free operation, connect the output ports, i.e. the output buses, of the computers R1 and R3 to data output channels AK1 and AK2, respectively. The output port A3 of the computer R3, for example, is always activated so that the result is provided in inverted form. The results produced by two different computers are thus transferred to the transfer switches U1 and U2 and, hence, to the data output channels AK1 and AK2 in nonequivalent form.

Following conversion in parallel-serial converters PS1 and PS2, the data delivered to a parallel output PA or a serial data channel KS can thus be checked by means of a simple nonequivalence check circuit AP, which provides a special nonequivalene check signal APS, whose presence is an indication that the delivered result is error-free.

If either of the two computers R1 and R3 fails, the computer R2 will be connected to the output channel associated with the faulty computer. This is done with the transfer switch U1 in the event of a failure of the computer R1, and with the transfer switch U2 in the event of a failure of the computer R3. If the faulty computer is the one at whose output port the result is to appear in inverted form, the control signal JNV simultaneously causes the output port A2 of the computer R2 to be switched over in such a manner that the result produced by the computer R2 appears at this output port in inverted form, too. This ensures continued safe data output on two nonequivalent data output channels. The nonequivalence check circuit detects any conceivable erroneous constellation of the switches U1 and U2, including the only possible erroneous connection of the transfer switches that could result in both data output channels being supplied from one computer, namely the connection of the output port of the computer R2 to both data output channels.

What is claimed is:

1. 2-out-of-3 selecting facility for a 3-computer system in which all computers process the same information in parallel, and in which a result is delivered for further processing only if at least two of the computers have arrived at this result, said facility comprising an output port (A1 ... A3) in each of the computers and a comparison data input port (E1 ... E3) in each of the computers which is connected to the output ports of the other two computers for the transfer of the results produced by these computers, and comprising comparison circuitry in each of the computers for comparing the result produced by it with the results produced by the neighboring computers and providing a corresponding comparison indication, to a majority voting circuit (MS), connected to receive said comparison indication depending on the comparison indications from all computers, and comprising two separate transfer switches (U1, U2) which are controlled by the majority voting circuit, said computers having outlet ports and said facility having two separate data output channels whereby said majority voting circuit controls said two separate transfer switches to connect the output ports to said two separate data channels wherein the output port (A1) of one of the computers (R1) is permanently connected to one of the transfer switches (U1), while the output port (A3) of another computer (R3) is permanently connected to the other transfer switch (U2), and that the output port of the third computer (R2) is connected to both transfer switches and, in response to a control instruction from the majority voting circuit (MS), can be connected to the first data output channel (AK1) by said one of the transfer switches (U1) or to the second data channel (AK2) by the other transfer switch (U2,) the output port of the computer previously permanently connected to the respective transfer switch being disconnected from the associated data output channel and wherein with ports (A1, A3) permanently connected to the transfer switches (U1, U2,) the results produced by the associated computers (R1, R3) appear in nonequivalent form, and that at the output port (A2) of the third computer (R2) the result produced by the latter appears in uninverted or inverted form depending on a control instruction (JNV) from the majority voting circuit (MS) and wherein the two data output channels (AK1, AK2) have parallel-serial converters (PS1, PS2) connected thereto whose outputs are connected to the inputs of a serial nonequivalence check circuit (AP), and that the output ports of the computers and the computers themselves can be disconnected in response to the output signal (APS) from the nonequivalence check circuit.

2. A 2-out-of-3 selecting facility as claimed in claim 1, characterized in that the majority voting circuit (MS) contains a read-only memory in which all possible combinations of comparison indications of the three computers and associated control instructions for the transfer switches (U1, U2) and for the disconnectable output ports (A1 ... A3) of the computers are stored, and that, if a comparison indication is present, the majority voting circuit delivers the associated control instructions.

* * * * *